Patented Nov. 21, 1922.

1,436,214

UNITED STATES PATENT OFFICE.

GUSTAV TEICHNER, OF VIENNA, AUSTRIA.

PROCESS FOR OXIDIZING HYDROCARBONS AND THEIR OXIDATION PRODUCTS.

No Drawing.     Application filed September 29, 1920. Serial No. 413,645.

*To all whom it may concern:*

Be it known that I, GUSTAV TEICHNER, a citizen of the Republic of Austria, and residing at Vienna, Austria, have invented certain new and useful Improvements in a Process for Oxidizing Hydrocarbons and Their Oxidation Products (for which I have made application in Austria, May 15, 1919), of which the following is a specification.

This invention relates to a process for oxidizing hydrocarbons and their oxidation products.

The transformation of hydrocarbons, for example, mineral oils into technically useful acids by means of catalytic oxidation with oxygen or air has long been the subject of endeavour. In many experiments the formation of organic acids has been observed; these however were obtained in very small amounts usually accompanied by large quantities of dark, sticky, asphalt and resinous materials, so that their industrial utilization was out of the question.

Recently it was found possible to oxidize to fatty acids and higher alcohols, a certain group of hydrocarbons, i. e., those occurring in commercial paraffin, by blowing the molten paraffin with air or oxygen at low temperatures preferably in the presence of catalyzers. This process, however, cannot be used with liquid mineral oils. If attempts are made to treat these oils in the same way, it is found that the oxidation, even in the presence of catalyzers, necessitates much higher initial temperatures, that it proceeds much more slowly, in spite of the higher temperatures, than with paraffin and that it soon comes to a stand-still, so that a higher saponification value than 30 cannot be attained at all, or only with difficulty. At the same time a darkening of the reaction mass and separation of black resin and pitch products takes place. These drawbacks cannot be obviated, either by the choice of particular catalyzers or by the use of larger amounts of catalyzer (10% and more).

It has now been found that the liquid hydrocarbons too can be quickly and effectually oxidized by blowing with air or oxygen at low temperature in the presence of small amounts of a catalyzer if the hydrocarbons that tend to form resins and asphalts are removed, by suitable refining, from the initial material prior to the oxidation. This is preferably effected by intensive treatment of the hydrocarbons with fuming sulphuric acid. When such previously treated initial material is blown, the course of the oxidation is completely altered. Thus, for example, mineral oil that has been treated with half its weight of fuming sulphuric acid, containing about 20% of anhydride, for half an hour to one hour at a temperature of 60 to 80° C. is powerfully attacked by oxygen or air at as low as 110° C., and is oxidized in a few hours to a saponification value of 200 or higher. This treatment with fuming sulfuric acid is carried out in the known and customary manner, i. e., by sufficiently agitating the oil and acid together to produce good mixing, after which the mass is settled and the oil separated from the sludge in the usual manner, and the oil then washed with water or alkali solution in the well known manner. In treating oil so purified, with oxygen in the presence of a catalyzer, there is no apparent diminution of the catalyzer action, nor dark coloration of the mass under reaction, nor separation of the same into several layers or deposition of asphaltic substances. The mass remains light and clear and only gradually assumes a reddish colour when the saponification value exceeds 200. The addition of the whole of the catalyzer at the beginning of the reaction is sufficient to maintain the oxidation actively throughout. The saponification value can easily be increased to 350 and above, in which case, however, the product finally acquires a resinous, viscous consistency, without, however, depositing any dark asphaltic substances. Inasmuch as the saturated hydrocarbons of the aliphatic series (alkanes) are, of all hydrocarbons, the least susceptible to attack, practically these alone are left intact by the sulphonation treatment. From the different behaviour of the product furnished by this refining process as compared with mineral oil which has only been refined with concentrated sulphuric acid or slightly fuming sulphuric acid, for instance, it may be concluded that the naphthenes and polynaphthenes present in mineral oils together with the alkanes, hinder the oxidation of the latter by the production of asphaltic substances. The intensity and duration of the sulphuric acid treatment must naturally, be adapted to the various initial materials, the refining being only continued until the refined product exhibits the desired properties.

The ease with which the liquid saturated hydrocarbons remaining in the product of refining can be oxidized is the more remarkable as they in the previous treatment, have resisted the strongest chemicals; it is surprising that hydrocarbons which are hardly attackable by fuming sulphuric acid (and also nitric acid) can be oxidized so quickly and effectively by simply blowing with air or oxygen at 110° C. (in the presence of a small amount of catalyzer).

Following is an example of a preferred method in accordance with my invention. The invention, however, is not restricted to the specific operating conditions and manipulations set forth in the example.

100 kilograms refined Galician spindle oil of 0.87 specific gravity, are freed as completely as possible by means of fuming sulphuric acid in known manner from the hydrocarbons not belonging to the alkanes, 65 kilograms of pale yellow coloured refined product being thus obtained. To this are added a suitable catalyzer for aiding oxidation, for example, 0.5 kilo zinc stearate and air is blown through it at 125° C. A violent reaction ensues accompanied by the disengagement of heat, so that effective cooling has to be employed to prevent an increase in the temperature. After about three hours, the saponification value has risen to 150, after 5 hours to 220, and after 20 hours to 360. The product remains homogeneous and free from dark asphaltic materials throughout. The colour gradually changes from light yellow to dark yellow and orange, the consistency at room temperature alters from thinly fluid to viscous and finally to a semi-solid state. The reaction products obtained after a sufficient length of time can be separated in known manner into a saponifiable and an unsaponifiable portion. If the fractions have not been oxidized too highly, the former yields mostly semi-solid soaps of good lathering and washing quality. The other saponifiable and unsaponifiable portions are partly worked up into other organic products of high value and partly are further oxidized, valuable acids, etc., being again formed.

The foundation on which the present process is based leads also to the possibility of selecting the suitable initial products from the hydrocarbon mixtures found in nature. It has been found advantageous to use for oxidation mineral oils, and the like, which contain at least 90% of saturated hydrocarbons of the aliphatic series (alkanes).

I claim:

1. A process for oxidizing liquid hydrocarbons, which consists in removing those hydrocarbons which tend to form resins and asphaltic substances from the initial hydrocarbon material and then subjecting the hydrocarbons to oxidation, in the presence of an oxygen-transferring catalyst, until a product having a saponification value far in excess of 30, is obtained.

2. A process for oxidizing liquid hydrocarbons, which consists in removing those hydrocarbons which tend to form resins and asphaltic substances from the initial hydrocarbon material and blowing the refined hydrocarbons with an oxygen containing gas, in the presence of an oxygen-transferring catalyst, until a product having a saponification value far in excess of 30, is obtained.

3. A process for oxidizing liquid hydrocarbons, which consists in removing those hydrocarbons which tend to form resins and asphaltic substances from the initial hydrocarbon material by refining with fuming sulphuric acid and blowing the refined hydrocarbons with an oxygen containing gas, in the presence of an oxygen-transferring catalyst, until a product having a saponification value far in excess of 30, is obtained.

4. A process for oxidizing liquid hydrocarbons, which consists in removing those hydrocarbons which tend to form resins and asphaltic substances from the initial hydrocarbon material by refining with fuming sulfuric acid and blowing the refined hydrocarbons with air in the presence of zinc stearate.

5. A process for oxidizing liquid hydrocarbons, which consists in removing those hydrocarbons which tend to form resins and asphaltic substances from the initial hydrocarbon material by refining with fuming sulfuric acid, blowing the refined hydrocarbons with air in the presence of zinc stearate, and saponifying the saponifiable portion of the product.

6. A process of oxidizing liquid hydrocarbons which comprises removing from a mineral oil material, those ingredients thereof which on blowing with air tend to produce asphaltic or resinous bodies, and introducing an oxygen-containing gas into such purified oil, in the presence of a zinc compound capable of serving as a catalyst to aid the formation of a saponifiable material.

7. A process which comprises treating a mineral oil product of which the hydrocarbon content is almost entirely saturated hydrocarbons of the $C_nH_{2n+2}$ series, with an oxidizing gas in the presence of a catalyst capable of aiding the formation of the fatty acids.

8. A process which comprises treating a mineral oil product of which the hydrocarbon content is almost entirely saturated hydrocarbons of the $C_nH_{2n+2}$ series, with an oxidizing gas in the presence of a catalyst capable of aiding the formation of fatty acids, such treatment being conducted at between about 110° C., and a temperature capable of decomposing free fatty acids.

In testimony whereof I have affixed my signature.

GUSTAV TEICHNER.